US009756133B2

(12) United States Patent
Harjanto et al.

(10) Patent No.: US 9,756,133 B2
(45) **Date of Patent: *Sep. 5, 2017**

(54) REMOTE RECOGNITION OF AN ASSOCIATION BETWEEN REMOTE DEVICES

(71) Applicant: Uniloc Luxembourg S.A., Luxembourg (LU)

(72) Inventors: Dono Harjanto, Irvine, CA (US); Craig S. Etchegoyen, Plano, TX (US)

(73) Assignee: Uniloc Luxembourg S.A., Luxembourg (LU)

( * ) Notice: Subject to any disclaimer, the term of this patent is extended or adjusted under 35 U.S.C. 154(b) by 375 days.

This patent is subject to a terminal disclaimer.

(21) Appl. No.: 14/176,906

(22) Filed: Feb. 10, 2014

(65) Prior Publication Data

US 2014/0181317 A1 Jun. 26, 2014

Related U.S. Application Data

(63) Continuation of application No. 13/586,111, filed on Aug. 15, 2012, now Pat. No. 8,693,473.

(51) Int. Cl.

| | |
|---|---|
| ***H04L 12/28*** | (2006.01) |
| ***H04L 29/08*** | (2006.01) |
| ***H04L 29/12*** | (2006.01) |
| *H04J 1/16* | (2006.01) |

(52) U.S. Cl.

CPC ............ *H04L 67/14* (2013.01); *H04L 61/103* (2013.01)

(58) Field of Classification Search

USPC ......................... 370/252, 254, 329, 389, 401

See application file for complete search history.

(56) References Cited

U.S. PATENT DOCUMENTS

| | | | |
|---|---|---|---|
| 4,246,638 | A | 1/1981 | Thomas |
| 4,458,217 | A | 7/1984 | Wong et al. |
| 4,779,224 | A | 10/1988 | Moseley et al. |
| 4,891,503 | A | 1/1990 | Jewell |

(Continued)

FOREIGN PATENT DOCUMENTS

| | | |
|---|---|---|
| EP | 1 739 879 | 6/2005 |
| EP | 1 637 958 | 3/2006 |
| GB | 2355322 | 4/2001 |
| WO | WO 92/09160 | 5/1992 |

(Continued)

OTHER PUBLICATIONS

"Canon User Manual—Nikon Coolpix S52/S52c," Apr. 21, 2008, entire manual.

(Continued)

*Primary Examiner* — John Pezzlo

(74) *Attorney, Agent, or Firm* — Sean D. Burdick

(57) ABSTRACT

A device identification server identifies a "household" to which a particular device belongs by associating the device with a LAN MAC address of the router through which the device connects to a wide area network such as the Internet because the LAN MAC address (i) is unique to the router and (ii) is not readily discoverable by interaction with the router through the wide area network, impeding spoofing by malicious entities. The device queries and receives the LAN MAC address of the router through the local area network. The device passes the LAN MAC address of the router along with its digital fingerprint to the device identification server. Devices that report the same LAN MAC address of the router through which they connect to the wide area network are determined to be from the same "household", i.e., to be managed by one and the same entity.

11 Claims, 7 Drawing Sheets

(56) References Cited

U.S. PATENT DOCUMENTS 4,956,863 A 9/1990 Goss
5,210,795 A 5/1993 Lipner et al.
5,235,642 A 8/1993 Wobber et al.
5,239,166 A 8/1993 Graves
5,241,594 A 8/1993 Kung
5,548,578 A * 8/1996 Matsune ................. H04L 69/40 370/248
5,666,415 A 9/1997 Kaufman
5,764,887 A 6/1998 Kells et al.
6,041,411 A 3/2000 Wyatt
6,161,185 A 12/2000 Guthrie et al.
6,167,517 A 12/2000 Gilchrist et al.
6,243,468 B1 6/2001 Pearce et al.
6,330,608 B1 12/2001 Stiles
6,418,472 B1 7/2002 Mi et al.
6,539,479 B1 3/2003 Wu
6,799,272 B1 9/2004 Urata
6,826,690 B1 11/2004 Hind et al.
6,981,145 B1 12/2005 Calvez et al.
7,082,535 B1 7/2006 Norman et al.
7,083,090 B2 8/2006 Zuili
7,100,195 B1 8/2006 Underwood
7,178,025 B2 2/2007 Scheidt et al.
7,181,615 B2 2/2007 Fehr et al.
7,233,997 B1 6/2007 Leveridge et al.
7,234,062 B2 6/2007 Daum et al.
7,272,728 B2 9/2007 Pierson et al.
7,305,562 B1 12/2007 Bianco et al.
7,310,813 B2 12/2007 Lin et al.
7,319,987 B1 1/2008 Hoffman et al.
7,418,665 B2 8/2008 Savage
7,590,852 B2 9/2009 Hatter et al.
7,620,812 B2 11/2009 Sikora et al.
7,819,322 B2 10/2010 Hammad et al.
7,836,121 B2 11/2010 Elgressy et al.
8,131,913 B2 3/2012 Pyeon
8,145,897 B2 3/2012 Brickell et al.
8,171,287 B2 5/2012 Villela
8,302,152 B1 10/2012 Hewinson
8,327,448 B2 12/2012 Eldar et al.
8,484,705 B2 7/2013 Hoppe et al.
8,667,265 B1 3/2014 Hamlet et al.
8,812,854 B2 8/2014 Shah et al.
8,874,695 B2 10/2014 Zhang et al.
8,949,609 B2 2/2015 Teranishi
8,954,729 B2 2/2015 Terry
2002/0065097 A1 5/2002 Brockenbrough et al.
2002/0091937 A1 7/2002 Ortiz
2002/0116616 A1 8/2002 Mi et al.
2002/0178366 A1 11/2002 Ofir
2002/0181747 A1 12/2002 Topping
2003/0001721 A1 1/2003 Daum et al.
2003/0056107 A1 3/2003 Cammack et al.
2003/0074568 A1 4/2003 Kinsella et al.
2003/0097331 A1 5/2003 Cohen
2003/0120920 A1 6/2003 Svensson
2003/0156719 A1 8/2003 Cronce
2003/0182428 A1 9/2003 Li et al.
2004/0003228 A1 1/2004 Fehr et al.
2004/0010685 A1 1/2004 Sakaguchi et al.
2004/0026496 A1 2/2004 Zuili
2004/0049685 A1 3/2004 Jaloveczki
2004/0107360 A1 6/2004 Herrmann et al.
2004/0117321 A1 6/2004 Sancho
2004/0149820 A1 8/2004 Zuili
2004/0172531 A1 9/2004 Little et al.
2004/0172558 A1 9/2004 Callahan et al.
2004/0177255 A1 9/2004 Hughes
2004/0187018 A1 9/2004 Owen et al.
2005/0018687 A1 1/2005 Cutler
2005/0034115 A1 2/2005 Carter et al.
2005/0160138 A1* 7/2005 Ishidoshiro ............. H04L 63/06 709/203
2005/0166263 A1 7/2005 Nanopoulos et al.
2005/0182732 A1 8/2005 Miller et al.
2005/0193198 A1 9/2005 Livowsky
2005/0268087 A1 12/2005 Yasuda et al.
2006/0005237 A1 1/2006 Kobata et al.
2006/0036766 A1 2/2006 Baupin et al.
2006/0080534 A1 4/2006 Yeap et al.
2006/0085310 A1 4/2006 Mylet et al.
2006/0090070 A1 4/2006 Bade et al.
2006/0115082 A1 6/2006 Kevenaar et al.
2006/0168580 A1 7/2006 Harada et al.
2006/0248600 A1 11/2006 O'Neill
2006/0265446 A1 11/2006 Elgressy et al.
2006/0280189 A1* 12/2006 McRae ............... H04L 61/2015 370/401
2007/0050850 A1 3/2007 Katoh et al.
2007/0061566 A1 3/2007 Bailey et al.
2007/0078785 A1 4/2007 Bush et al.
2007/0094715 A1 4/2007 Brown et al.
2007/0113090 A1 5/2007 Villela
2007/0124689 A1 5/2007 Weksel
2007/0126550 A1 6/2007 Richardson
2007/0143408 A1 6/2007 Daigle
2007/0143838 A1 6/2007 Milligan et al.
2007/0174633 A1 7/2007 Draper et al.
2007/0198850 A1 8/2007 Martin et al.
2007/0207780 A1 9/2007 McLean
2007/0209064 A1 9/2007 Qin et al.
2007/0214093 A1 9/2007 Colella
2007/0234409 A1 10/2007 Eisen
2007/0260883 A1 11/2007 Giobbi et al.
2008/0010673 A1 1/2008 Makino et al.
2008/0028455 A1 1/2008 Hatter et al.
2008/0052775 A1 2/2008 Sandhu et al.
2008/0104683 A1 5/2008 Nagami et al.
2008/0120195 A1 5/2008 Shakkarwar
2008/0120707 A1 5/2008 Ramia
2008/0152140 A1 6/2008 Fascenda
2008/0177997 A1 7/2008 Morais et al.
2008/0226142 A1 9/2008 Pennella et al.
2008/0242405 A1 10/2008 Chen et al.
2008/0261562 A1 10/2008 Jwa et al.
2008/0268815 A1 10/2008 Jazra et al.
2008/0276321 A1 11/2008 Svancarek et al.
2008/0289025 A1 11/2008 Schneider
2009/0019536 A1 1/2009 Green et al.
2009/0083833 A1 3/2009 Ziola et al.
2009/0113088 A1 4/2009 Illowsky et al.
2009/0132813 A1 5/2009 Schibuk
2009/0138643 A1 5/2009 Charles et al.
2009/0198618 A1 8/2009 Chan et al.
2009/0210932 A1 8/2009 Balakrishnan et al.
2009/0259747 A1 10/2009 Sagefalk et al.
2009/0271851 A1 10/2009 Hoppe et al.
2009/0300744 A1 12/2009 Guo et al.
2010/0082973 A1 4/2010 Brickell et al.
2010/0197293 A1 8/2010 Shem-Tov
2010/0306038 A1 12/2010 Harris
2011/0047373 A1 2/2011 Karasawa et al.
2011/0093943 A1 4/2011 Nakagawa et al.
2011/0244829 A1 10/2011 Kase
2011/0271109 A1 11/2011 Schilling et al.
2012/0030771 A1 2/2012 Pierson et al.
2013/0031619 A1 1/2013 Waltermann et al.
2013/0044760 A1* 2/2013 Harjanto ................. H04L 67/14 370/401
2013/0183936 A1 7/2013 Smtih et al.
2013/0244614 A1 9/2013 Santamaria et al.
2014/0258441 A1* 9/2014 L'Heureux ........... H04W 12/06 709/217

FOREIGN PATENT DOCUMENTS

WO WO 00/058895 10/2000
WO WO 01/90892 11/2001
WO WO 03/032126 4/2003
WO WO 2004/054196 6/2004
WO WO 2005/104686 11/2005
WO WO 2008/013504 1/2008
WO WO 2008/127431 10/2008

OTHER PUBLICATIONS

Iovation, "Using Reputation of Devices to Detect and Prevent Online Retail Fraud," White Paper, Apr. 2007.
Iovation, "Controlling High Fraud Risk of International Transactions," *Iovation Reputation Services,* White Paper, May 2007.
Jensen et al., "Assigning and Enforcing Security Policies on Handheld Devices," 2002, 8 pages.
Johnson et al. "Dynamic Source Routing in Ad Hoc Wireless Networks," *Mobile Computing,* Kluwer Academic Publishers, 1996.
Posting from Slashdot on the article "Smart Cards for Windows XP Login" Comment "Re: PIN" posted Dec. 3, 2001. http://en.wikipedia.org/w/index.php?title=Two-factor_authentication&ildid=216794321.
Wikipedia: "Software Extension," May 28, 2009, Internet Article retrieved on Oct. 11, 2010. XP002604710.
H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.
David J-L, "Cookieless Data Persistence in Possible," Apr. 23, 2003, Internet Article retrieved on Sep. 21, 2010. XP002603490.

* cited by examiner

REMOTE RECOGNITION OF AN ASSOCIATION BETWEEN REMOTE DEVICES

CROSS-REFERENCE TO RELATED APPLICATIONS

This patent application is a continuation of co-pending U.S. patent application Ser. No. 13/586,111 filed on Aug. 15, 2012, and the benefit of such earlier filing dates is hereby claimed by applicant under 35 U.S.C. §120.

BACKGROUND OF THE INVENTION

1. Field of the Invention

The present invention relates generally to device recognition and, more particularly, methods of and systems for recognizing that multiple remote devices are likely under common control and operation.

2. Description of the Related Art

Device fingerprinting (also known as device recognition) is a technology which assigns a unique identifier based on a device's software and hardware settings. This identification technique is attractive because of its adaptability to any device—even where cookies have failed—including PCs, mobile devices, set top boxes, and game consoles.

Device fingerprinting is used to improve on-line advertisement targeting, reduce click fraud, personalize website experiences, and enable multi-channel attribution. While device fingerprinting can identify individual devices, there is currently no accurate way to determine that two or more devices are under common control and operation, e.g., of the same household.

Consider the computer network shown in FIG. 1, which depicts a sampling of typical connections of computing devices to a wide area network (WAN), i.e. the Internet cloud. The connections are made possible by an Internet Service Provider (ISP), which assigns an IP address to each subscriber connected to the network, for example, through a DSL or cable modem. The diagram shows that the subscriber at 100 Main Street is assigned the IP address 77.264.195.10, the public library is assigned the IP address 77.264.198.17, the City Hall is assigned IP address 88.157.64.171, and the subscriber at 2505 Wagonwheel Street is assigned IP address 88.157.64.100. Three of these subscribers have configured a local area network (LAN1, LAN2 and LAN3, as shown) through the use of a router. Downstream of each router are the computing devices residing within each respective LAN. Each such device is expected to share the same WAN IP address, but its location will be differentiated from all others according to its LAN IP address.

A problem arises, however, when attempting to remotely identify devices that belong to the same household, because IP addresses are not static. That is because the entity assigning IP addresses—whether the ISP or the LAN administrator—typically assigns them for a finite period, known as a lease time. Lease time periods typically vary, and may be granted on the order of hours, days, months, or longer, according to the preference of the administrator. Therefore the population of computing devices associated with a particular LAN may share a common WAN IP address on one day, but share another WAN IP address the following day.

To make matters worse, an ISP may rotate an available pool of WAN IP addresses among its many subscribers, such that computing devices in different households could be accessible through identical WAN IP addresses during different parts of the day. For example, from 8 AM to noon, IP address 77.264.195.10 may be assigned to the LAN 1 subscriber and associated with each of its computing devices, and later that same day from noon to 4 PM the same IP address may be assigned to the LAN 2 subscriber and associate with each of its computing devices.

The same problem of rotating IP addresses according to lease time expiration can also occur at the LAN level. As in the WAN case, the rules governing assignment of the LAN IP address are typically configurable by the administrator. Although this does not affect the determination whether a particular computing device exists within an identified household, it emphasizes that, due its transience, the LAN IP address is unsuitable for use as an identifier for purposes of reliably fingerprinting a device.

What is needed is a more reliable way to accurately determine whether two or more devices are under mutual control and operation.

SUMMARY OF THE INVENTION

In accordance with the present invention, a device identification server identifies a "household" to which a particular device belongs by associating the device with data (i) that is unique to the router through which the device connects to a wide area network such as the Internet and (ii) that is not readily discoverable by interaction with the router through the wide area network. Using data that is not readily discoverable by interaction with the router through the wide area network impedes spoofing of such data by malicious entities.

The primary function of a router is to manage a network boundary, distinguishing between network traffic intended for two or more networks connected to the router. In a typical installation, a router connects to a wide area network and a local area network. Accordingly, a router typically has a local area network interface and a wide area network interface. Details of the wide area network (WAN) interface are generally discoverable by interaction with the router through the wide area network. However, details of the local area network (LAN) interface are generally not so discoverable. A media access control (MAC) address of a given device is unique among all networked devices. The LAN MAC address of the router is usually unique among all LAN MAC addresses of all routers and is not readily discoverable by interaction with the router through the WAN. While a system administrator can manually change the LAN MAC address of a router such that uniqueness of the LAN MAC address is less certain, most leave the LAN MAC address unaltered. In addition, unlike WAN IP addresses, the LAN MAC address of the router is very stable and changes very rarely, if ever.

The device identification server gains access to the LAN MAC address of the router by cooperation of the device to be identified by the device identification server. In addition to generating and providing a digital fingerprint to the device identification server, the device queries and receives the LAN MAC address of the router through the local area network. The device passes the LAN MAC address of the router along with its digital fingerprint to the device identification server.

Devices that report the same LAN MAC address of the router through which they connect to the wide area network are determined to be from the same "household", i.e., to be managed by one and the same entity.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

DETAILED DESCRIPTION

In accordance with the present invention, a device identification server 250 (FIG. 2) associates a LAN MAC address of a router 230 with digital fingerprints of devices 202-206 that communicate with device identification server 250 through router 230. Devices whose digital fingerprints are associated with the same router LAN MAC address are presumed to be under common control and operation, i.e., constituents of the same household.

As used herein, "household" does not necessarily infer a residential locale. Instead, "household" refers to constituent devices of a private network connected to wide area network (WAN) 240 (which is the Internet in this illustrative embodiment). Local area network (LAN) 220 is an example of such a private network, being connected to WAN 240 through router 230. Many homes in which families have multiple devices accessing the Internet do so through a router and a LAN. Other establishments do so as well, such as businesses, libraries, government agencies, non-profit organizations, etc. In some cases, an unsecured router may, intentionally or unintentionally, be available for limited public access by transient computing devices that happen to come within wireless reception range of the router. According to the invention described herein, such transient devices are considered constituent devices of the LAN, and such a network is recognized herein as being a private network. All transient and non-transient computing devices accessing the LAN through a common router are members of the same household.

Figure 1:
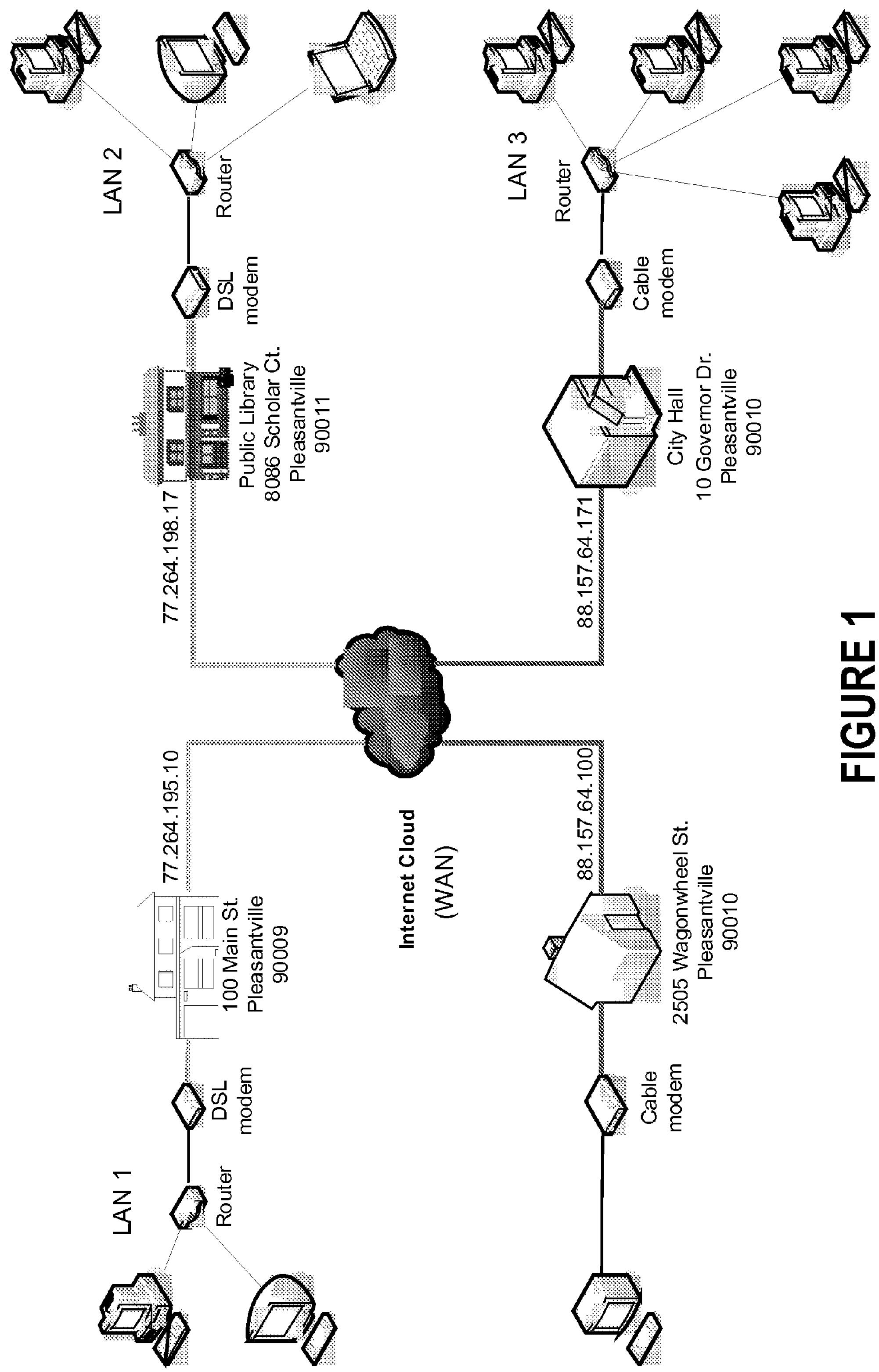
FIG. 1 is a block diagram showing a sampling of LAN configurations connected to a WAN, such as the Internet, in a typical system configuration.
Figure 2:
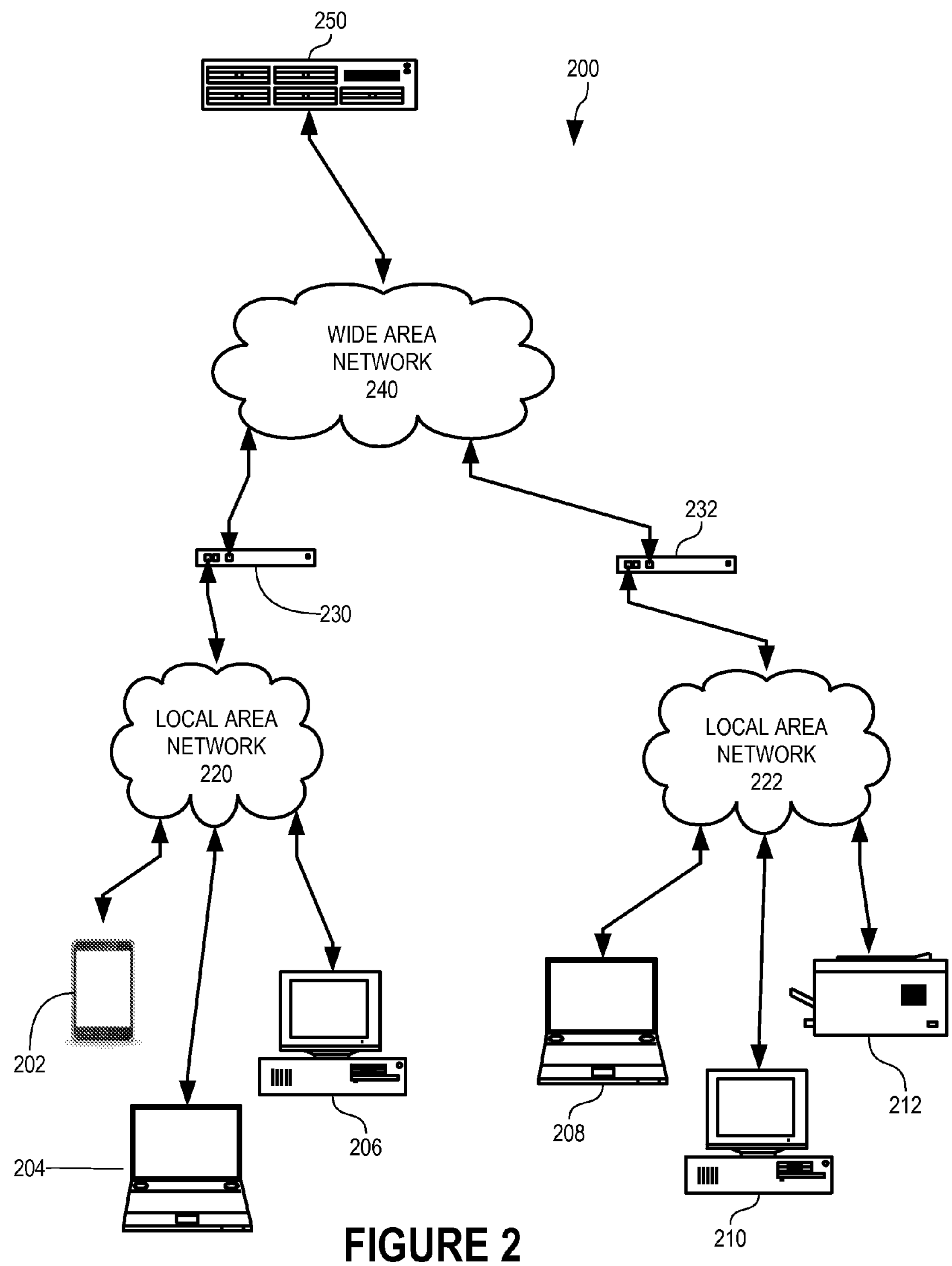
FIG. 2 is a diagram showing a number of devices coupled through routers to a wide area network and therethrough to a device identifier server in accordance with one embodiment of the present invention.
Figure 3:
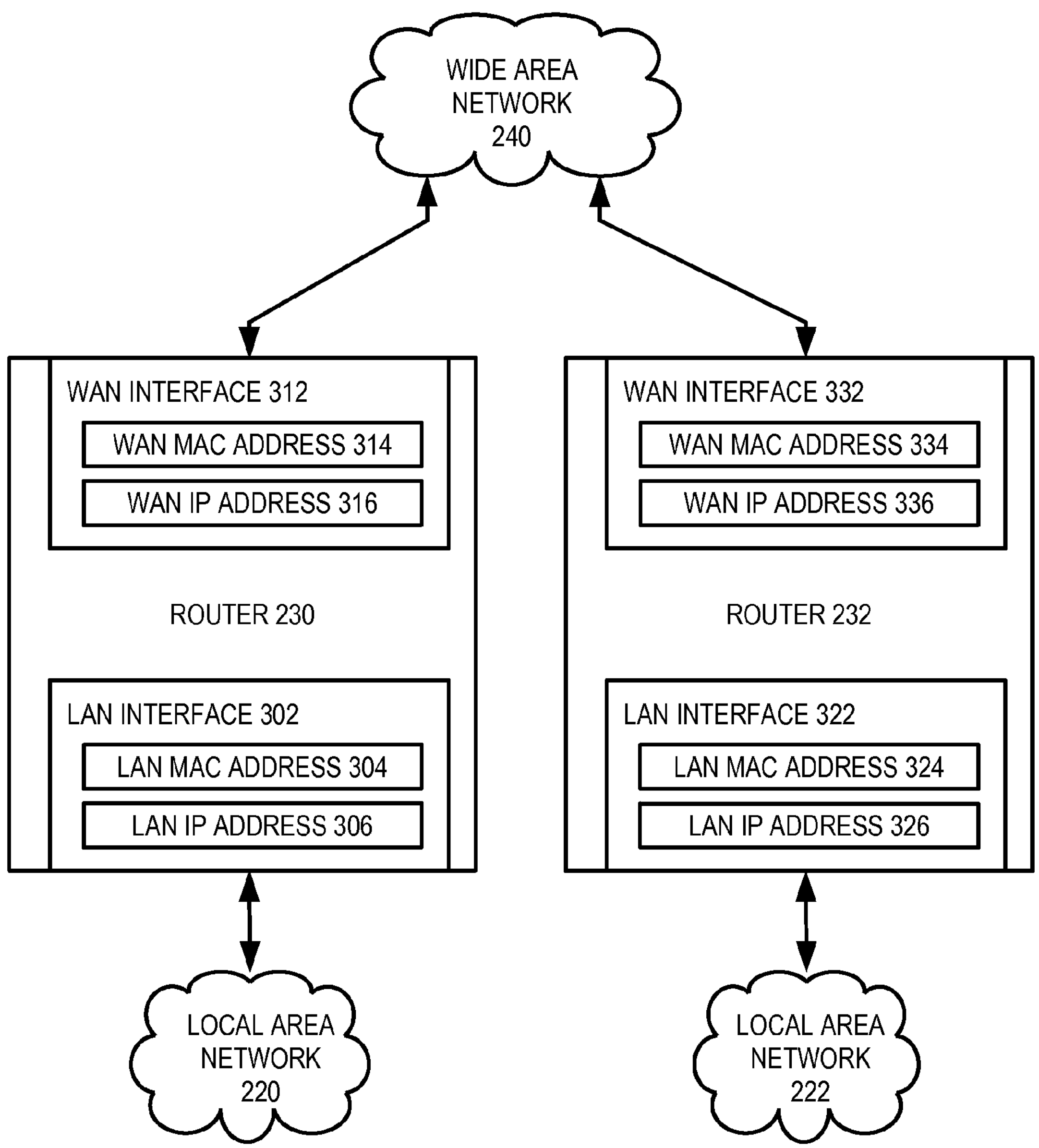
FIG. 3 is a block diagram showing the routers of FIG. 2 in greater detail.

As shown in FIG. 3, router 230 includes a LAN interface 302 and a WAN interface 312, each of which can be Ethernet networking circuitry. Similarly, router 232 includes a LAN interface 322 and a WAN interface 332, each of which can also be Ethernet networking circuitry. As shown in FIG. 2, LAN 220 connects router 230 with multiple devices 202-206. Three such devices 202-206 are shown for illustration only, and may represent many more devices that in practice may exist within the same household. LAN 220 is typically under the control of a single entity, such as a family or a business. While LAN 220 is shown as a single network, it should be appreciated that LAN 220 can include multiple local area networks, all of which directly or indirectly access WAN 240 through router 230. LAN 222 connects router 232 with multiple devices 208-212 in similar fashion.

A number of IP addresses are reserved for private use and are not permitted to be used in WAN 240, which is the Internet in this illustrative embodiment. Configuration of router 230 includes specifying addresses, e.g., private IP addresses, that are considered within LAN 220. Accordingly, router 230 can distinguish between addresses within LAN 220 and addresses that should be routed through WAN 240.

Each of interfaces 302, 312, 322 and 332 (FIG. 3) includes a MAC (Media Access Control) address and an IP (Internet Protocol) address. In particular, WAN interface 312 includes a WAN MAC address 314 and a WAN IP address 316. WAN interface 332 includes a WAN MAC address 334 and a WAN IP address 336. WAN MAC address 314 should be unique to router 230 throughout WAN 240, and WAN MAC address 334 should be unique to router 232 throughout WAN 240. However, most routers allow the system administrator to manually set the WAN MAC address and WAN MAC addresses are discoverable through WAN 240. Accordingly, spoofing of another router's WAN MAC address is easy.

WAN IP address 316 is unique to router 230 at any given time; however, WAN IP address 316 can change over time, making use of WAN IP address 316 alone a determining identifier of router 230 and the household behind it (i.e., the household of LAN 120) difficult and transitory. With similar limitations, WAN IP address 336 is unique to router 232 at any given time.

LAN interface 302 includes a LAN MAC address 304 and a LAN IP address 306. LAN interface 322 includes a LAN MAC address 324 and a LAN IP address 326. LAN MAC addresses 304, 324 and LAN IP addresses 306, 326 have the advantage of not being discoverable through WAN 240. Accordingly, spoofing LAN MAC addresses and LAN IP addresses is particularly difficult. In addition, access to LAN MAC addresses and LAN IP addresses by device identifier server 250 is not straightforward.

LAN IP address 306 is unique to router 230 only within LAN 220. Similarly, LAN IP address 326 is unique to router 232 only within LAN 222. For example, the system administrator of router 232 can use the same private IP addresses for LAN 222 that the administrator of router 230 uses for LAN 220. Router 232 can even have exactly the same LAN IP address as router 230.

However, LAN MAC address 304 should be unique to router 230 throughout all MAC addresses of devices of WAN 240 and of other LANs such as LAN 222. Since LAN MAC address 304 is likely unique throughout all the Internet including LANs and is generally not publicly discoverable, device identification server 250 uses LAN MAC address 304, in combination with WAN IP address 316, to uniquely identify a household to which each of devices 202-206 belong.

Similarly, LAN MAC address 324 should be unique to router 232 throughout all MAC addresses of devices of WAN 240 and of other LANs such as LAN 220. Since LAN MAC address 324 is likely unique throughout all the Internet including LANs and is generally not publicly discoverable, device identification server 250 uses LAN MAC address 324, in combination with WAN IP address 336, to uniquely identify a household to which each of devices 208-212 belong.

Since LAN MAC addresses can be manually set, neither LAN MAC address 304, 324 is absolutely guaranteed to be unique among all LAN MAC addresses of all routers connected to WAN 240. However, while neither of the respective WAN IP addresses 316, 336 may remain constant, they each tend to be selected from a relatively small range of IP addresses. Accordingly, the combination of LAN MAC address 304 and WAN IP address 316, and the combination of LAN MAC address 324 and WAN IP address 336, each has a very high probability of uniquely identifying its associated router 230, 232 (respectively) among all routers connected to WAN 240. LAN MAC address 304 or 324 is highly likely to be unique since few system administrators change LAN MAC addresses of routers and can therefore be a useful identifier of the router itself.

For simplicity hereafter, the householding processes of the invention are described only with reference to router 230 and devices within LAN 220. The description applies analogously to any other router communicating through WAN 240.

Figure 4:
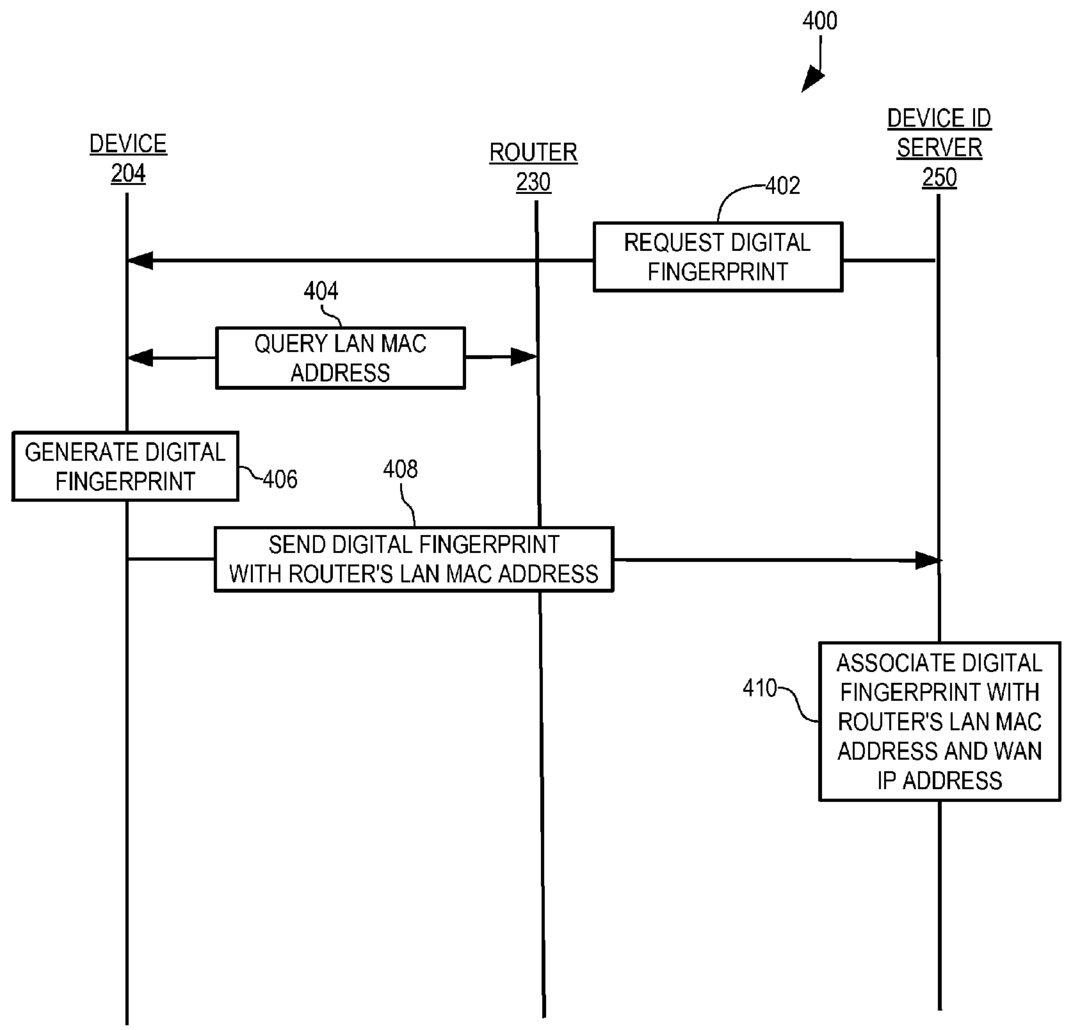
FIG. 4 is a transaction diagram illustrating one embodiment according to the invention of a method by which the device identification server computer of FIG. 2 identifies a household of a particular device in accordance with an embodiment of the present invention.

The manner in which device identifier server 250 obtains a LAN MAC address 304 of router 230 is illustrated by the transaction flow diagram 400 (FIG. 4). Device identifier server 250 includes device identification logic 620 (FIG. 6) that controls behavior of device identifier server 250 in identifying devices in the manner described herein. Device identifier server 250 is described in greater detail below.

Device identification logic 620 sends a request for a digital fingerprint to device 204 (FIG. 2) in step 402 (FIG. 4). While device 204 is described herein as the illustrative example, each of devices 202-212 (FIG. 2) can be configured to act in the manner described herein with respect to device 204.

Device 204 includes digital fingerprint generation logic 520 (FIG. 5) that controls behavior of device 204 in response to the digital fingerprint request of step 402 (FIG. 4). In step 404, digital fingerprint generation logic 520 requests and receives LAN MAC address 304 (FIG. 3) from router 230.

Most devices have an Address Resolution Protocol (ARP) table that includes known LAN IP addresses and associated LAN MAC addresses of all devices connected to the local area network, e.g., LAN 220 in this illustrative example. In addition, each device implementing the Internet Protocol has an IP address designated as a gateway IP address. All communications to an IP address other than the known IP addresses of the ARP table are forward to this gateway IP address. The device at the gateway IP address is responsible for redirecting communications to the intended recipient. In essence, the device of the gateway IP address is a router, regardless of whether the device is a dedicated router device or a computer configured to act as a router. Accordingly, each device connected to LAN 220 has LAN IP address 306 (FIG. 3) of router 230 as the gateway IP address. The gateway IP address (e.g., LAN IP address 306 of router 230) is associated with LAN MAC address 304 within the ARP table of device 204.

Thus, device 204 receives LAN MAC address 304 during network configuration and stores LAN MAC address 304 in the networking logic inherent in the operating system of device 204. Alternatively, device 204 can query router 230 directly for its LAN MAC address 304 as needed.

In step 406 (FIG. 4), digital fingerprint generation logic 520 (FIG. 5) generates digital fingerprint 522. Digital fingerprints are known and are described, e.g., in U.S. Pat. No. 5,490,216 (sometimes referred to herein as the '216 patent), and in U.S. Patent Application Publications 2007/0143073, 2007/0126550, 2011/0093920, and 2011/0093701, the descriptions of which are fully incorporated herein by reference.

In step 408 (FIG. 4), digital fingerprint generation logic 520 sends digital fingerprint 522 and LAN MAC address 304, retrieved in step 404, to device identification logic 620 of device identification server 250. The digital fingerprint 522 and LAN MAC address 304 pass through router 230 from device 204 to device identification server 250, and WAN IP address 316 of router 230 is therefore available to device identification server 250.

In step 410 (FIG. 4), device identification logic 620 associates the digital fingerprint received in step 408 with the LAN MAC address and WAN IP address received in step 408. In another embodiment, during step 408, digital fingerprint generation logic 520 may include the LAN MAC address as an input to the digital fingerprint 522, such that it is concatenated, hashed, encrypted, or otherwise combined with other inputs to the fingerprinting algorithm in a manner that allows it to be recovered from the digital fingerprint 522 in step 410 by the device identification logic 620.

Figure 5:
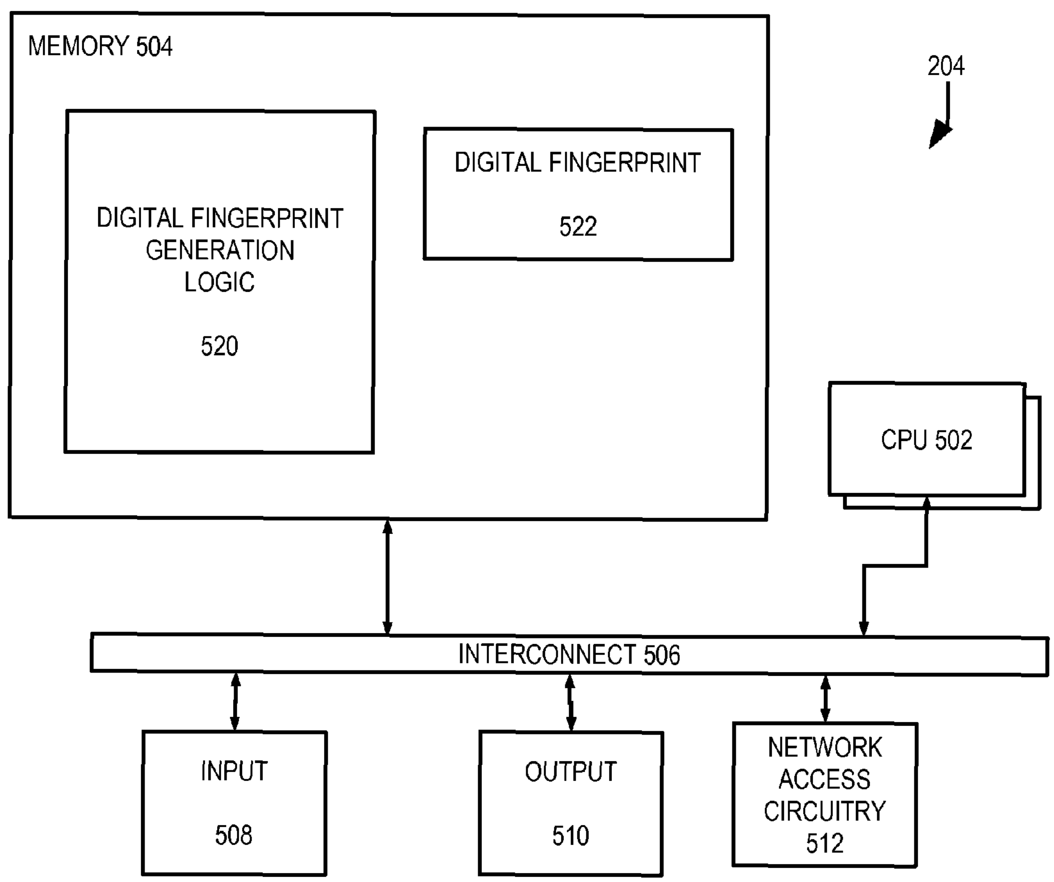
FIG. 5 is a block diagram showing a personal computing device of FIG. 2 in greater detail.

Device 204 is a computing device such as a smart-phone or personal computer and is shown in greater detail in FIG. 5. It should be appreciated that each of devices 202-212 is a computing device that is directly analogous to device 204. Unless otherwise noted herein, the following description of device 204 is equally applicable to others of devices 202-212.

Device 204 includes one or more microprocessors 502 (collectively referred to as CPU 502) that retrieve data and/or instructions from memory 504 and execute retrieved instructions in a conventional manner. Memory 504 can include generally any computer-readable medium, for example, persistent memory such as magnetic and/or optical disks, ROM, and PROM and volatile memory such as RAM.

CPU 502 and memory 504 are connected to one another through a conventional interconnect 506, which is a bus in this illustrative embodiment and which connects CPU 502 and memory 504 to one or more input devices 508, output devices 510, and network access circuitry 512. Input devices 508 can include, for example, a keyboard, a keypad, a touch-sensitive screen, a mouse, a microphone, and one or more cameras. Output devices 510 can include, for example, a display—such as a liquid crystal display (LCD)—and one or more loudspeakers. Network access circuitry 512 sends and receives data through computer networks such as LAN 220 (FIG. 2), for example.

A number of components of device 204 are stored in memory 504. In particular, digital fingerprint generation logic 520 is all or part of one or more computer processes executing within CPU 502 from memory 504 in this illustrative embodiment but can also be implemented using digital logic circuitry. As used herein, "logic" refers to (i) logic implemented as computer instructions and/or data within one or more computer processes and/or (ii) logic implemented in electronic circuitry. Digital fingerprint 522 is data stored persistently in memory 504.

Figure 6:
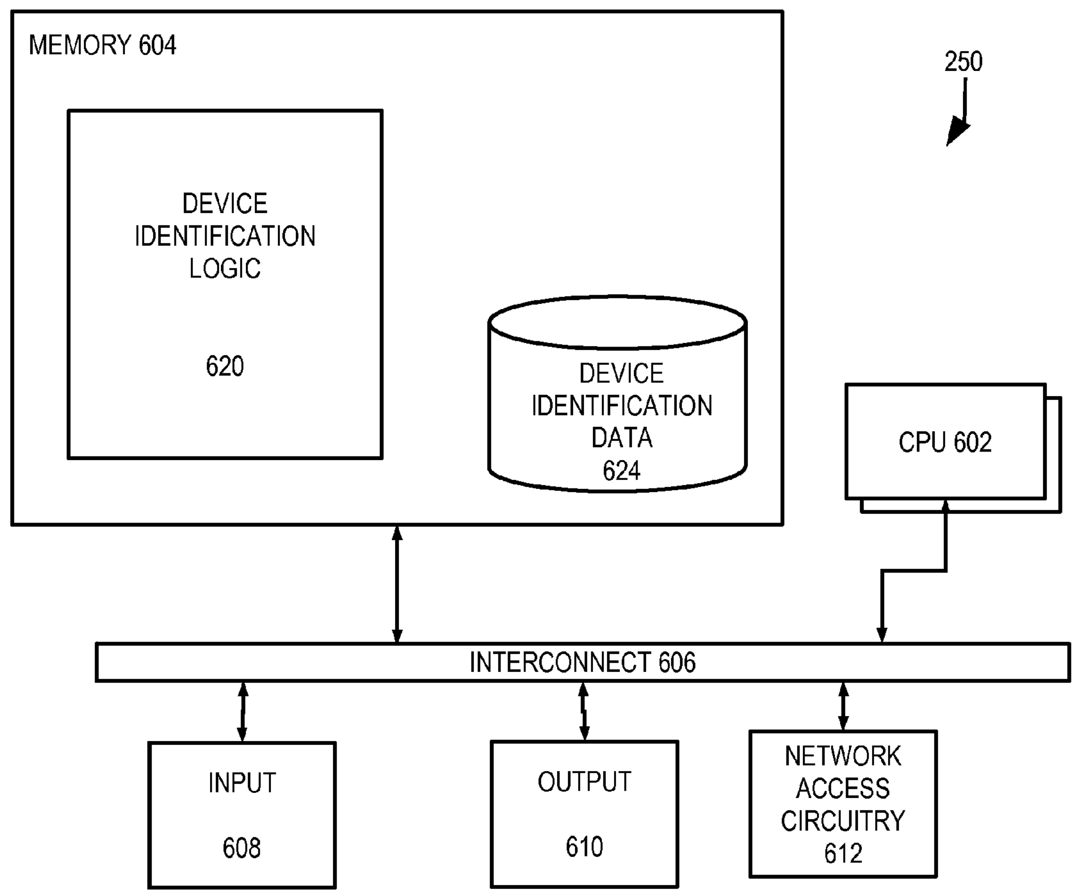
FIG. 6 is a block diagram showing the device identifier server of FIG. 2 in greater detail.

Device identification server 250 is a trusted server that can verify identity of a particular device and a household to which that particular device belongs and is shown in greater detail in FIG. 6. Device identification server 250 includes one or more microprocessors 602 (collectively referred to as CPU 602), an interconnect 606, input devices 608, output devices 610, network access circuitry 612 that are directly analogous to CPU 502 (FIG. 5), an interconnect 506, input devices 508, output devices 510, network access circuitry 512, respectively. As device identification server 250 (FIG. 6) is a server computer, input devices 608 and output devices 610 can be omitted.

A number of components of device identification server 212 are stored in memory 604. In particular, device identification logic 620 is all or part of one or more computer processes executing within CPU 602 from memory 604 in this illustrative embodiment but can also be implemented using digital logic circuitry. Device identification data 624 is data stored persistently in memory 404. In this illustrative embodiment, device identification data 624 is organized as one or more databases.

Figure 7:
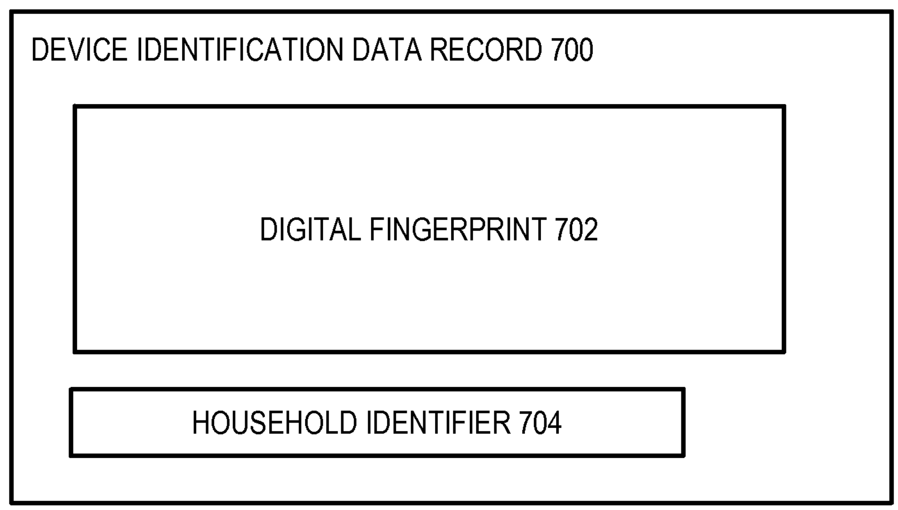
FIG. 7 is a block diagram of a device identification data record managed by the device identification server of FIG. 6 in greater detail.

Device identification data 624 includes a number of device identification data records such as device identification data record 700 (FIG. 7). In this illustrative example, device identification data record 700 represents device 204 (FIG. 2). Device identification data record 700 (FIG. 7) includes a digital fingerprint 702, which represents digital fingerprint 522 (FIG. 5) of device 204 to thereby identify device 204, and a household identifier 704 (FIG. 7). In this illustrative embodiment, household identifier 704 represents an association between LAN MAC address 304 (FIG. 3) and WAN IP address 316 of router 230.

It should be appreciated that, since devices 202-206 (FIG. 2) connect to WAN 240 through router 230, device identification data record 700 (FIG. 7) for each of those devices will have the same household identifier 704 and therefore will be readily identifiable as being of the same household. Similarly, since devices 208-212 (FIG. 2) connect to WAN 240 through router 232, device identification data record 700 for each of those devices will have the same household identifier 704 and therefore will be readily identifiable as being of the same household. However, any of devices 202-206 will have a different household identifier 704 than any of devices 208-212, thereby indicating distinct households.

In this illustrative embodiment, digital fingerprint generation logic 520, in step 408, sends an irreversible, cryptographic hash of LAN MAC address 304 to device identification server 250. In this way, device identification server 250 never has direct access to LAN MAC address 304 of router 230 but can still uniquely identify router 230 by the hash. Analogous digital fingerprint generation logic in others of devices 202-212 use the same hashing method to send irreversible, cryptographic hashes of LAN MAC addresses of routers 230-232. In alternative embodiments, devices 202-212 send LAN MAC addresses in clear text and device identification server 250 has direct access to LAN MAC addresses of routers. In either embodiment, it is preferred that secure communications links, e.g., HTTPS transfers, are used to transport LAN MAC addresses to avoid discovery by unauthorized devices of LAN MAC addresses of routers 230-232.

In yet another embodiment, digital fingerprint 702 and household identifier 704 are inextricably combined, e.g., in an irreversible hash, such that device identification server 250 cannot readily identify devices of the same household. However, in such an embodiment, device identification server 250 identifies device 204 (FIG. 2) as a different device when connected to WAN 240 through different LANs.

Device identification server 250 can also store household identifier 704 (FIG. 7) separately from digital fingerprint 702 in a many-to-many relationship in a relational database. In addition, WAN IP address 316 (FIG. 3) can change and in fact does in most installations, particularly residential LANs. Accordingly, household identifier 704 (FIG. 7) can change over time in embodiments in which WAN IP address 316 (FIG. 3) is included therein. Device identification server 250 can separate LAN MAC address 304 from WAN IP address 316 such that household identifier 704 (FIG. 7) is a relationship between a single LAN MAC address and one or more devices 202, 204, 206. In an alternative embodiment, a household identifier received from a device that differs from a previous household identifier of the same device in WAN IP address only, i.e., has the same LAN MAC address, is determined to supersede the prior household identifier. In yet another embodiment, changes to household identifier 704 (FIG. 7) are treated as a different household and all devices of the household eventually update their household identifier in subsequent performances of the transaction of transaction flow diagram 400 (FIG. 4).

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A computer readable medium useful in association with a computer which includes one or more processors and a memory, the computer readable medium including computer instructions which are configured to cause the computer, by execution of the computer instructions in the one or more processors from the memory, to identify a local area network though which a device connects to a wide area network by at least:

receiving, from the device and from one or more other devices, router-specific data that is specific to a router through which the local area network is connected to the wide area network and that is not accessible from the router through a connection between the router and the wide area network; and determining that the device and at least one of the other devices connect to the wide area network through the same local area network upon a determination that the router-specific data received from the device and the at least one of the other devices is specific to one and the same router;

wherein the router-specific data includes a local area network media access control address of the router.

2. The computer readable medium of claim 1 wherein the router-specific data also includes a wide area network internet protocol address.

3. A computer readable medium useful in association with a computer which includes one or more processors and a memory, the computer readable medium including computer instructions which are configured to cause the computer, by execution of the computer instructions in the one or more processors from the memory, to bind a device to a local area network through which the device connects to a wide area network by at least:

receiving, from the devices, router-specific data that is specific to a router through which the local area network is connected to the wide area network and that is not accessible from the router through a connection between the router and the wide area network; and combining the router-specific data with a digital fingerprint of the device such that the device has the digital fingerprint only when connected to the wide area network through the local area network.

4. The computer readable medium of claim 3 wherein the router-specific data includes a local area network media access control address of the router.

5. The computer readable medium of claim 4 wherein the router-specific data also includes a wide area network internet protocol address.

6. A computer system comprising:

at least one processor;

a computer readable medium that is operatively coupled to the processor;

network access circuitry that is operatively coupled to the processor; and device identification logic (i) that executes in the processor from the computer readable medium and (ii) that, when executed by the processor, causes the computer to identify a local area network though which a device connects to a wide area network by at least:

receiving, from the device and from one or more other devices, router-specific data that is specific to a router through which the local area network is connected to the wide area network and that is not accessible from the router through a connection between the router and the wide area network; and determining that the device and at least one of the other devices connect to the wide area network through the same local area network upon a determination that the router-specific data received from the device and the at least one of the other devices is specific to one and the same router.

7. The computer system of claim 6 wherein the router-specific data includes a local area network media access control address of the router.

8. The computer system of claim 7 wherein the router-specific data also includes a wide area network internet protocol address.

9. A computer system comprising:

at least one processor;

a computer readable medium that is operatively coupled to the processor;

network access circuitry that is operatively coupled to the processor; and device identification logic (i) that executes in the processor from the computer readable medium and (ii) that, when executed by the processor, causes the computer to bind a device to a local area network though which the device connects to a wide area network by at least:

receiving, from the devices, router-specific data that is specific to a router through which the local area network is connected to the wide area network and that is not accessible from the router through a connection between the router and the wide area network; and combining the router-specific data with a digital fingerprint of the device such that the device has the digital fingerprint only when connected to the wide area network through the local area network.

10. The computer system of claim 9 wherein the router-specific data also includes a wide area network internet protocol address.

11. The computer system of claim 10 wherein the router-specific data includes a local area network media access control address of the router.

* * * * *